Jan. 15, 1952     W. P. BOVARD     2,582,937
RAIL BOND
Filed Nov. 4, 1948
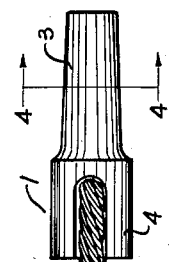
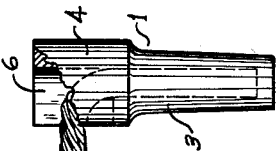
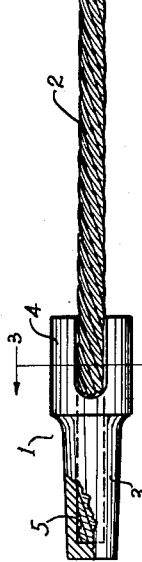
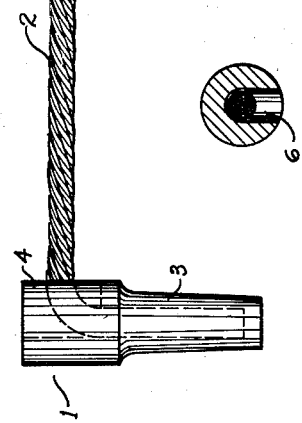
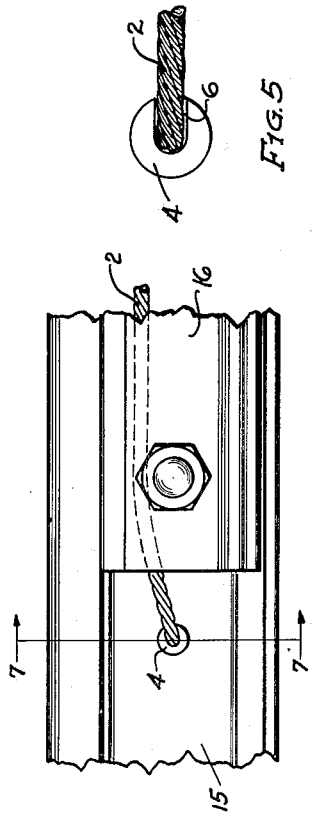
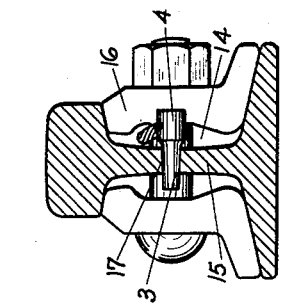
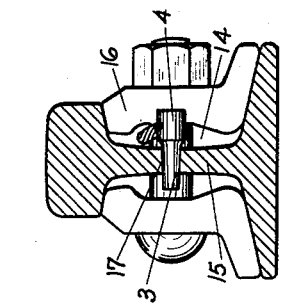
INVENTOR.
WILLIAM P. BOVARD.
BY
ATTORNEY.

Patented Jan. 15, 1952

2,582,937

UNITED STATES PATENT OFFICE 2,582,937

RAIL BOND

William P. Bovard, Mansfield, Ohio, assignor to The Ohio Brass Company, Mansfield, Ohio, a corporation of New Jersey Application November 4, 1948, Serial No. 58,320

9 Claims. (Cl. 238—14.8)

1

This invention relates to current connectors and more specifically to connectors of the rail bond type.

This bond is of the driven type that is one which may be applied to holes in the web of a rail by means of a hammer.

A hole is first drilled through the web of each rail adjacent its end such that a bond installed in the said holes and spanning the joint between adjacent rail ends will electrically connect the rails.

Such a bond is quite desirable and also a bond which may be installed under the fish plate by passing the bond terminal longitudinally through the space between the plate and web of the rail so that it is not necessary to first remove the plate.

There are bonds on the market which requires heat of a high order to both manufacture and to install the bond.

The herein described bond requires no heat either in the assembly of the parts or in the installation of the completed bond and for that reason none of the parts are affected through heat application especially the strand or cable connecting the terminals as it enters or emerges from the terminal.

This is important since the bond is subjected to severe vibration stresses and heat applied to the conductor or cable would reduce its calculated resistance to vibration.

Some means other than that requiring heat to connect the terminals and ends of the conductor must be used and in the bond herein described this connection is effected by friction only between the parts which is produced by compressing the terminals onto the conductor ends.

To further understand the construction and manufacture of the bond reference is to be had to the following specification and accompanying drawings.

Fig. 1 shows the form of my bond when it is to be positioned between a rail and fish plate, after the plate has been installed as later described. One terminal is shown in partial section.

Fig. 2 shows the form my bond in Fig. 1 is given when it is to be applied to a rail before the fish plate is positioned or the bond is to be applied around the outside of the plate or after the form in Fig. 1 has been passed between the rail and plate and before installing in the rail. One terminal is shown in partial section.

Fig. 3 is a transverse section on the line 3—3 of Fig. 1.

Fig. 4 is a transverse section on the line 4—4 of Fig. 1.

Fig. 5 is a top view of the end of one terminal of Fig. 2.

2

Fig. 6 shows a vertical plan view of my bond applied to a rail.

Fig. 7 is a view in partial section on the line 7—7 of Fig. 6.

In the embodiment shown in Fig. 1 the bond is shown in its best form when it is desired to place the conductor between the rail and joint plate without removing the plate; in this form the axis of the terminals and of the cable are common.

In the embodiment of Fig. 2 the axis of the terminals are at right angles to the axis of the conductor; in this form the conductor is applied along the outer face of the joint plate.

In Figs. 1 and 2 the terminals 1 are preferably of steel while the conductor 2 is preferably of hard-drawn bronze with a tensile strength of around 90,000 pounds per square inch.

The terminals have a shank 3 and a head 4. The shank is provided with a longitudinally disposed hole 5 the axis of which corresponds preferably to that of the shank 3, the wall of the shank being radially compressible.

The head 4 is provided with a slot 6 opening on the top face of the head 4 and on one side of the head. The width and longitudinal length of the slot being substantially that of the diameter of the cable and diameter of the hole 5 when first produced to receive the conductor end.

The hole 5 intersects the slot 6 and the end and side openings intersecting to form the slot 6.

As previously stated the conductor 2 is preferably of a bronze such as a copper-cadmium alloy and is hard-drawn, producing a conductor of about 90,000 pounds tensile strength per square inch. This provides a conductor which withstands vibration to a very marked degree but which is greatly reduced if the conductor is annealed especially at the terminal.

To assemble the bond, the ends of the cable 2 (cut to required length) are inserted in the holes 5 which extend almost through the entire shank 3. The shank is slightly larger in diameter than a standard adopted by the American Association of Railroads, when first formed.

Having assembled a terminal to the end of the conductor, the shank of the terminal is then forced into a die having a tapered hole slightly smaller in diameter than that of the shank. This forces the shank into strong contact with the conductor and reduces the diameter of the shank but not enough to meet the A. A. R. standard which will just permit entering the end of the tapered shank 3 in a drilled ⅜ inch hole in the rail web.

The shank is now forced into a tapered opening of correct size in another die which causes the shank to still further grip the conductor and gives the shank the required diameter and taper.

If the bond is to be slid through the space 14 between the rail web 15 and the fish plate 16 for installation as shown in Figs. 7 and 8, the several axes of the parts are assembled in longitudinal alignment as in Fig. 1.

After being positioned in the space 14, the terminals are then bent, by the operator, at right angles to the conductor with the conductor positioned in and extending sideways from the slots 6. The shank 3 of the terminals may now be inserted in the drilled holes 17 and a few hammer blows applied to the head 4 will force the shank securely into the drilled opening 17 in the rail web.

The embodiment of my invention shown in Fig. 2 is constructed and assembled in the same manner as the embodiment of Fig. 1 except the forming of the terminals at right angle to the conductor is performed at the factory and is received by the customer in the form shown in Fig. 2 unless the bond is to be used between the plate and rail.

The hole 5 may extend entirely through the shank if desired and the slot 6 may open on both sides of the head but I prefer the slot 6 as shown as it provides a head which will withstand the manufacturing pressure and hammer blows better than a through-slot and the slot is as long as or longer than the diameter of the conductor thereby protecting the same from hammer blows.

In order to uniformly transfer to the shank the force used in installing the terminal, the lower portion of the head 4 which is integrally secured to the larger end of the shank is maintained intact except for the central opening which registers with the adjacent open end of the bore 5 in the shank.

By making the head 4 of greater diameter than that of the shank, and making the slot 6 of a width sufficient to take the conductor, the side walls of the slot will extend along the conductor and project laterally beyond the larger end of the shank and thereby give support to the conductor.

It sometimes occurs that a user of bonds wishes to use an extra long length of conductor in a few instances therefore he orders the conductor in a continuous length and a sufficient member of loose terminals.

In this case a required length of the conductor is cut, the ends positioned in the bore of a pair of terminals and the tapered shank driven in a drilled hole in the rail thereby compressing the shank of the terminals into secure engagement with the conductor as the shank is forced into the drilled hole in the rail.

I have described the preferred embodiments of my invention, but it will be apparent that modifications will suggest themselves to those skilled in the art which will fall within the scope of my invention, therefore; I wish to be limited only by my claims.

What I claim is:

1. A rail bond comprising, a pair of terminal members, each terminal member comprising a tapered shank adapted to be secured in an opening in a rail and having a longitudinal bore, the shank having a radially compressible wall and an enlarged portion integral with the larger end of the shank to which a force may be applied in installing the terminal in a rail opening, each enlarged portion provided with a portion completely and uniformly surrounding the bore at the adjacent end of the shank, the enlarged portion provided with a slot intersecting the axis of the bore but not intersecting the said surrounding portion, the slot being at least as deep longitudinally as the diameter of the bore and having an end-opening and a single side-opening, an elongated conductor, a terminal secured to each end of the conductor with the conductor end positioned in the bore and the intervening portion of the conductor projecting through one of the said openings in the enlarged portion and the wall of the shank of each terminal compressed into firm engagement with the enclosed end of the conductor to secure the parts together and form a unitary device.

2. A rail bond comprising, a conductor, a pair of spaced terminals in axial and longitudinal alignment, each terminal provided with a tapered shank having a longitudinal bore and a compressible wall, a terminal member positioned on each end of the conductor and the wall of the shank compressed into firm engagement with the conductor to secure the parts together into a unitary device and against separation, each terminal provided with a head to receive the force applied in installing the terminal in a rail opening, each head having a slot intersecting the longitudinal axis of the bore each slot having an end-opening and a side-opening, the length of the side-opening being equal at least to the diameter of the conductor but less than the length of the head, the intervening portion of the conductor extending unattached to the head through the said end-openings and projecting from the enlarged portion in co-extensive alignment with the longitudinal axis of the bores, the said end and side openings intersecting whereby the co-extensive portion of the conductor may be bent into the side-opening with the conductor and its bight positioned within the slot after the device as above described has been positioned in the space between the rail and fish plate from one end of said space.

3. A terminal for a rail bond comprising, a tapered shank portion with an enlarged portion of greater diameter than the diameter of the shank portion at the larger end of the shank, the shank provided with a longitudinal bore with a compressible wall, the enlarged portion provided with a slot intersecting the longitudinal axis of the bore, the slot provided with an end-opening intersecting the bore, and the slot also provided with a side-opening intersecting the end-opening, the width and length of the slot being not less than the diameter of the bore, but of less length than the length of the enlarged portion, the terminal being so constructed and arranged that a conductor end may be inserted in the bore and secured therein by compression of the said wall with the projecting portion of the conductor extending in longitudinal alignment with the axis of the bore and through the end opening.

4. A terminal for a rail bond comprising, a tapered shank, an integrally formed head projecting longitudinally from the enlarged end of the shank and having a diameter greater than the diameter of the adjacent end of the shank, the shank provided with a bore of uniform diameter and a radially compressible wall, integrally formed means closing the smaller end of the shank, the head provided with a longitudinally dispoesd slot having an end-opening and a side-opening, the width of the said openings being substantially the same as the diameter of the bore, the length of the side-opening being not less than the diameter of the bore but less than the length of the head whereby the portion of the head at the adjacent end of the shank will be intact and will completely surround the adjacent end of the shank, the said portion of the head having an opening registering with the open end of the bore, the terminal being so constructed and its parts so arranged that a conductor-end may be positioned in the bore and secured in the shank by axial compression of the wall of the shank and the adjacent portion of the conductor extend into the slot and project from the terminal through one of the said openings.

5. A terminal for a bond conductor comprising, an elongated, tapered and recessed shank with radially collapsible wall, a head integrally and symmetrically secured to the larger end of the shank, the head having a greater diameter than the adjacent end of the shank, the inner-end portion of the head completely surrounding the adjacent end of the shank and provided with a through opening registering with the adjacent end of the recess in the shank, the outer portion of the head provided with a slot parallel to and intersecting the axis of the shank, the slot having a width and a length at least as great as the diameter of the recess in the shank, and the wall forming the slot projecting laterally from the larger end of the shank.

6. A connector comprising, a terminal with a tapered shank provided with a longitudinal bore closed at the smaller end of the shank and with a compressible wall, an enlarged head integrally secured to the other end of the shank to receive the force required to install the terminal in an opening, a portion of the head covering the entire adjacent end of the shank except for an opening through said portion and registering with the adjacent end of the bore whereby the force applied to the head will be uniformly transmitted to the entire end of the shank, the head having a slot with a side-opening and a top-opening, the slot intersecting the axis of the said opening, a single stranded conductor having an end portion positioned in said bore and passing freely through the said opening and the other portion of the conductor extending freely through the slot and one of the said openings of the slot, the wall of the shank being compressed into firm engagement with the enclosed portion of the conductor.

7. A rail bond comprising a conductor having its ends each provided with a portion having a single bend at right angles to the intermediate portion of the conductor, a pair of terminals each having a tapered shank and a longitudinal bore with a laterally compressible wall positioned on the bent ends of the conductor, one terminal to a conductor end, and the wall of the tapered shank compressed into firm engagement with the conductor to secure the parts together, each terminal provided with a head to receive the impact forces during installation of the terminal in a rail opening, a portion of each head completely surrounding the adjacent end of the shank to uniformly transmit said force to the entire adjacent end of the shank, the said portion of the head having an opening registering with the bore, each head having a top and side opening slot intersecting the axis of the said bore and in which slot the bight of the conductor is freely positioned with the said intermediate portion electrically connecting the heads and angularly disposed to the longitudinal axis of the terminals and projecting through the side-opening of the slots, the side walls of the slot being sufficiently deep to extend along the conductor and project laterally beyond the larger end of the shank.

8. A rail bond comprising a single strand conductor, a pair of spaced terminals connected by the conductor in longitudinal alignment therewith, each terminal provided with a tapered shank adapted to be secured in an opening in a rail and having a longitudinal bore with a compressible wall, a terminal positioned on each end of the conductor and the wall of the tapered shank compressed radially into firm engagement with the conductor to secure the parts together into a unitary device against separation with the intervening portion of the conductor in coextensive alignment with the axis of the bores, each terminal provided with a closure at one end and also provided with an enlarged portion integral with the other end of the shank and to which enlarged portion a force may be applied in installing the terminal in the rail opening, each enlarged portion having a portion completely surrounding the adjacent end of the shank whereby the installing force is applied uniformly to the adjacent end of the shank, the enlarged portion having a slot with an end-opening through which the conductor projects, the slot also having a side-opening, the slot being at least as deep as the diameter of the conductor whereby the conductor and its bight may be positioned within the side-opening of the slot.

9. A rail bond comprising a pair of terminal members, each terminal member comprising a tapered shank adapted to be secured in an opening in a rail and having a longitudinal bore, the shank having an enlarged portion integral with the larger end of the shank to which a force may be applied in installing the terminal in a rail opening, means extending at right angles to the axis of the bore closing the bore at the smaller end of the shank, the wall of the shank between the enlarged portion and the said means closing the bore being radially compressible, the enlarged portion provided with a slot intersecting the longitudinal axis of the bore, the slot provided with an end-opening intersecting the bore and the slot also provided with a side-opening intersecting the end-opening, the width and length of the slot being not less than the diameter of the bore but of less length than the length of the enlarged portion, the terminal being so constructed and arranged that a conductor may be inserted in the bore and secured therein by compression of the compressive portion of the said wall with the projecting portion of the conductor extending in angular relation to the axis of the bore and through the side-opening.

WILLIAM P. BOVARD.

REFERENCES CITED

The following references are of record in the file of this patent:

UNITED STATES PATENTS

| Number | Name | Date |
| --- | --- | --- |
| Re. 12,359 | Richardsen | June 13, 1905 |
| 517,884 | Paulsen | Apr. 10, 1894 |
| 1,177,180 | Garton | Mar. 28, 1916 |
| 1,387,548 | Lowry | Aug. 16, 1921 |
| 1,858,284 | Schwartz | May 17, 1932 |
| 2,416,883 | Selquist | Mar. 4, 1947 |